United States Patent Office 3,149,234
Patented Sept. 15, 1964

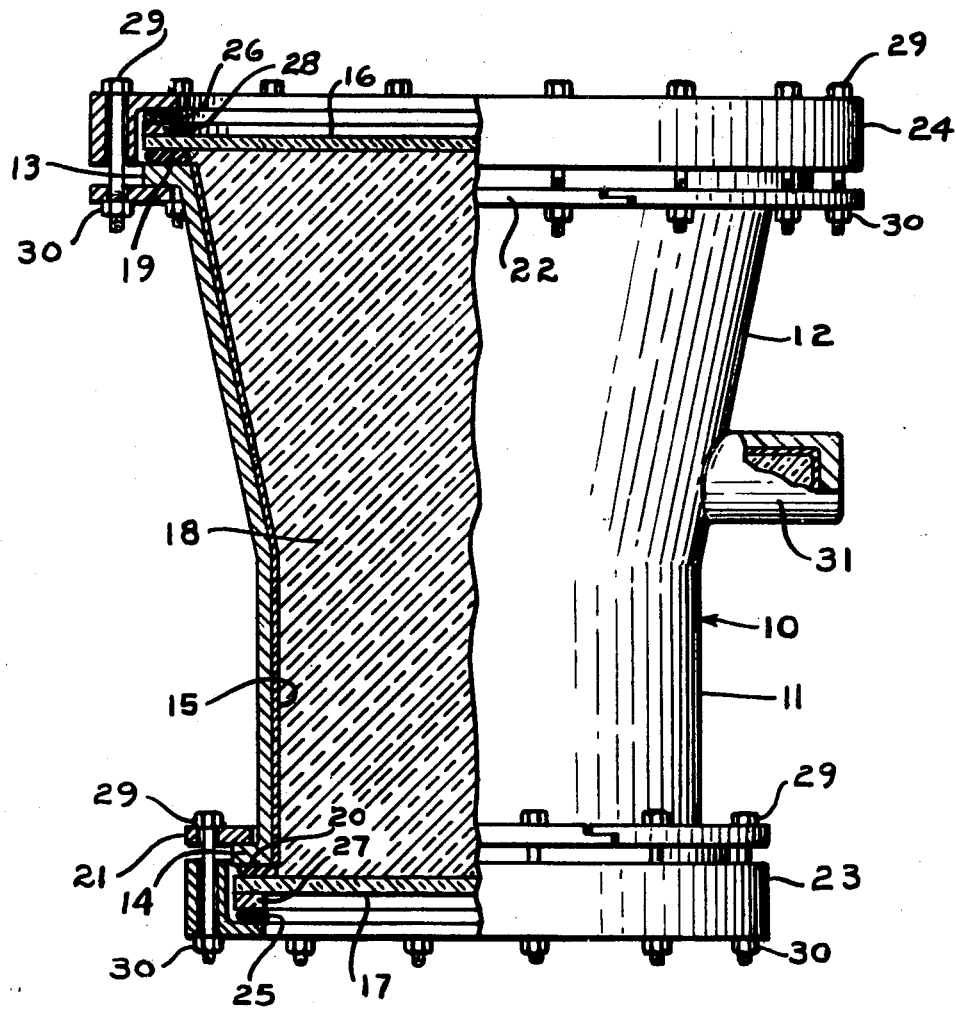

3,149,234
HIGH DENSITY, SOFT PHOSPHATE GLASS, METHOD, AND GAMMA RADIATION SHIELDING WINDOW
Harrison P. Hood and Thomas C. MacAvoy, Corning, N.Y., assignors to Corning Glass Works, Corning, N.Y., a corporation of New York
Filed Oct. 27, 1959, Ser. No. 849,055
6 Claims. (Cl. 250—108)

This invention relates to novel phosphate glasses which are particularly suitable for radiation shielding windows and methods of making them.

Radiation shielding windows, which permit visual observation into a radioactive area from an area safe for personnel have heretofore been fabricated from sheets of soda-lime-silicate glasses or lead-silicate glasses. The high intensity of the radiation makes it necessary to utilize windows which are three to five feet and even more in thickness to provide the required absorption of energy. Because it has heretofore been impossible to fabricate glass with optical qualities in such thickness, the usual practice has been to make slabs about 4″ to 9″ in thickness and build a complete unit by placing the required number of such slabs in a housing and filling the intervening air space with a transparent liquid having an index of refraction identical, or nearly so, with the glass. While such windows have proved useful, many problems have been associated with their construction and use. Not only has it been difficult to find transparent liquids which do not lose their desirable properties upon irradiation, but also traces of impurities either in the liquid or on the surfaces of the glass plates has caused many such windows to lose their transparency upon irradiation because of clouding. Furthermore, the glass itself, while having very good transparency to visible radiation when fabricated, darkens or "browns" in use due to the effects of the irradiation. While it is known that such browning can be inhibited by the inclusion of suitable materials in the glass such as cerium oxide, these materials give colors or absorptions of their own when added in the concentration necessary for full protection, thus decreasing the visual transparency of the glass. Another difficulty experienced in such prior radiation-shielding windows has been that they accumulate electrical charge on the surface of the plates which has caused them to shatter or break down when sufficient charge has been so accumulated.

Another type of radiation shielding window which has heretofore been utilized consists of a cell comprising glass face plates with an aqueous solution of zinc bromide therebetween. Such a window is relatively dangerous because a fracture of one of the face plates would result in the almost instantaneous loss of the shielding solution.

Thus it can be seen that prior transparent materials which have been utilized as radiation-shielding windows have heretofore not been completely satisfactory because they lose transparency or have had safety problems associated with their use.

The principal object of this invention is to provide a transparent glass which will not darken upon exposure to high-levels of short-wave radiation. Another object of this invention is to provide a glass with a density of at least 2.5 and a viscosity at room temperature (25° C.) of at least $10^4$ poise. A still further object of this invention is to provide a glass which will not accumulate electrical charge thereon when subjected to high levels of irradiation.

Another object of this invention is to provide a method for melting massive articles of optically transparent glass at relatively low temperatures.

A still further object of this invention is to provide a radiation-shielding window which will not present undue safety hazards.

Other objects will become apparent upon consideration of the description of the invention as hereinafter set forth.

The drawing is a plan view, partially in section, of a radiation window according to this invention.

We have now found that the above objects can be obtained by melting a glass in a manner hereinafter set forth which consists essentially, on a mole percent basis, of 26–51% $P_2O_5$, 33–56% $H_2O$, and a total of 12–26% of an oxide of a metal of the Sixth Period of the periodic table selected from the group consisting of lead, mercury, and thallium, the total essential oxides comprising at least 95% of the composition and the maximum total weight percent of the $P_2O_5$ and $H_2O$ being 70%.

Thus it is apparent that the essential metal oxides of metals of the Sixth Period of the periodic table are the oxides of metals having an atomic number of 80 to 82.

Furthermore, glasses consisting essentially, on a mole percent basis, of 31–39% $P_2O_5$, 36–55% $H_2O$, and 13–19% PbO, are especially suitable for use in a radiation-shielding window because of their relative ease of melting and stability against crystallization.

The above composition ranges are critical because of the following considerations:

A greater amount of $P_2O_5$ produces a glass which browns and is too hard, making casting of the glass in massive sections difficult or impossible, and/or a glass with a density which is too low to be useful.

A smaller amount of $P_2O_5$, and/or a greater amount of water, produces a composition which is not only too light but also crystallizes.

Too little water produces a glass which browns and is too hard and/or crystallizes readily on cooling.

Too little Sixth Period oxide produces a composition which is too fluid and does not have the required density.

Too much Sixth Period metal oxide produces a composition which crystallizes rather than forming a glass.

While the oxides which are essential for the desired glass composition are $P_2O_5$, $H_2O$, and the Sixth Period oxides, PbO, $Tl_2$, and HgO, other conventional glass-modifying oxides such as $ThO_2$, $Al_2O_3$, $Bi_2O_3$, $K_2O$, $Cs_2O$, BaO, SnO, and ZnO, may be added individually or in combination in amounts up to 5% mole percent of the total composition to modify the properties of the glass. However exceeding 5%, either individually or in combination, is unsatisfactory for the following reasons:

The oxides of the trivalent and tetravalent metals such as aluminum, bismuth, and thorium are too refractory to go into solution in a practical time, and, therefore, must be added to the batch as the corresponding nitrate or the like, which cause the molten batch to foam, and an excess over the stated amount of the optional constituents stabilizes the foam.

An excess of the lighter metallic oxides such as $K_2O$, SnO and ZnO decreases the density of the glass to an undesirable extent.

The amount of BaO cannot exceed the stated amount as it is not soluble and promotes crystallization of the composition.

These glasses are particularly suitable for use as radiation-shielding windows because they have excellent transparency to visible radiation, as high as 95.8% transmittance of wave lengths between 0.4 and 0.8 micron in a 3-inch thickness, or, to state it in another way, an absorption coefficient of only 0.014 per inch, and such transparency is not impaired by exposure to short-wave length radiation in amounts of $10^8$ roentgens, and more, while possessing a density of about at least 2.5 which allows the glass to be utilized in windows passing through concrete walls generally utilized in defining the limits of a radio active area.

THE METHOD OF MELTING THE GLASS

As these glasses are quite corrosive and contain a relatively large amount of water in their composition, the melting process necessary to produce them is a critical feature of this invention. The containers which are suitable for melting these glasses are made of either platinum or nonsilicon-containing refractories, such as alumina and zirconia, whereas other containers such as glass, silica-containing refractories and metals, such as nickel, tungsten, molybdenum, silver, aluminum, and steel either cause the melt to crystallize upon cooling or react with a melt causing discoloration and hydrogen evolution.

A suitable method for making these mixtures consists of mixing the batch materials, such as phosphoric acid, $P_2O_5$, and lead oxide (litharge), and any other desired constituents in a platinum container and heating the batch to a temperature of about 350° C. as rapidly as possible. A small amount of an oxidizing agent such as lead nitrate or nitric acid is preferably included in the batch to prevent reduction to metal of any of the metallic oxides. The melted batch is maintained at such temperature for as short a period as possible consistent with allowing the glass to homogenize, and thereafter is cooled rapidly to below 200° C. by removing the container from a heated area and allowing it to cool in a room-temperature environment.

However, we have found that while the above method is suitable for small batches of the desired glass, amounts of glass in sufficient quantity to make a practical radiation-shielding window should be produced by premixing the phosphoric acid, $P_2O_5$, a minor proportion of compounds of the metallic constituents of the glass and an excess amount of water with a small amount of an oxidizing agent, such as nitric acid, and heating the thus premixed constituents to a temperature of between about 250° C. and 280° C. and then adding the major proportion of the compounds of the metallic constituents of the glass to the heated batch in sufficiently small increments to allow each increment to dissolve therein before the next increment is added thereto, and heating the batch at a rate sufficient that by the time the batch has attained a temperature of 350° C. all of the constituents have been combined into a desirable glass. The fused melt can thereafter be cooled or the temperature can be increased still further up to about 390° C. The temperature of about 390° C. must not be exceeded as an insoluble precipitate forms which will not redissolve in the glass at a temperature of less than 500° C. In order to remove the precipitate, the glass must be subjected to such a high temperature that a large amount of the water is removed therefrom, making the glass unsuitable for its intended purposes.

GLASS COMPOSITIONS

Table I sets forth suitable batches for making the glasses of this invention.

Table I

|  | 1 | 2 | 3 | 4 | 5 | 6 |
|---|---|---|---|---|---|---|
| $P_2O_5$ (g.) | 33 | 39 | 33 | 28.8 | 43.1 | 40.6 |
| $H_3PO_4$ (ml.) (85% N.F.) | 24 | 16 | 20 | 24 | 10.5 | 12.9 |
| PbO (g.) | 36 | 36 | 36 | 36 | 36 | 36 |
| $H_2O$ (g.) | 15 | | | | | |
| $HNO_3$ (ml.) (Conc.) | | 2 | 2 | 2 | 2 | 2 |

|  | 7 | 8 | 9 | 10 | 11 | 12 |
|---|---|---|---|---|---|---|
| $P_2O_5$ (g.) | 298 | 264 | 49.9 | 49.2 | 49.9 | 37.2 |
| $H_3PO_4$ (ml.) (85% N.F.) | 128 | 160 | 6.6 | 6.6 | 6.6 | 16 |
| PbO (g.) | 288 | 288 | 37.5 | 56.2 | 46.0 | 42.8 |
| $HNO_3$ (ml.) (Conc.) | 16 | 16 | 2 | 2 | 2 | 2 |

|  | 13 | 14 | 15 | 16 | 17 | 18 |
|---|---|---|---|---|---|---|
| $P_2O_5$ (g.) | 21.5 | 35 | 35 | 22.1 | 27.2 | 37.2 |
| $H_3PO_4$ (ml.) (85% N.F.) | 5.27 | 21 | 21 | 24 | 24 | 16 |
| PbO | | | | 35 | 35 | 49.6 |
| $HNO_3$ (ml.) (Conc.) | | 2 | 2 | 2 | | 2 |
| Red HgO (g.) | | | 35 | 10 | | |
| $TlNO_3$ (g.) | | | 80.8 | | 3.54 | 10.7 |
| Lead metaphosphate glass* | 30.4 | | | | | |

|  | 19 | 20 | 21 | 22 | 23 | 24 | 25 |
|---|---|---|---|---|---|---|---|
| $P_2O_5$ | 27.2 | 29.5 | 27.2 | 27.2 | 27.2 | 22.1 | 40.6 |
| $H_3PO_4$ (ml.) (85% N.F.) | 24 | 24 | 24 | 24 | 24 | 24 | 12.9 |
| PbO | 35 | 35 | 35 | 35 | 35 | 35 | 49.6 |
| $HNO_3$ (ml.) (Conc.) | 2 | | | 2 | 2 | 2 | 2 |
| Th $(NO_3)_4 \cdot 4H_2O$ | | 6.06 | | | | | |
| Al $(NO_3)_3 \cdot 9H_2O$ | | | 10.7 | | | | 5.0 |
| $K_2CO_3$ | | | | 4.26 | | | |
| $BaCO_3$ | | | | | 3.74 | | |
| $Bi_2O_3$ | 2.9 | | | | | | |
| Yellow HgO | | | | | | 10 | |

*A glass consisting by weight of 60% PbO and 40% $P_2O_5$.

The glasses produced by melting the above batches are set forth in Table II on a mole percent basis.

Table II

|  | 1 | 2 | 3 | 4 | 5 | 6 |
|---|---|---|---|---|---|---|
| $P_2O_5$ | 34.7 | 39.5 | 35.6 | 34.5 | 43.0 | 41.1 |
| PbO | 14.7 | 16.1 | 14.9 | 14.6 | 18.3 | 17.5 |
| $H_2O$ | 50.5 | 44.4 | 49.5 | 50.9 | 38.7 | 41.4 |
| Density | 2.9 | 3.0 | 2.9 | 2.9 | 3.0 | 3.1 |

|  | 7 | 8 | 9 | 10 | 11 | 12 |
|---|---|---|---|---|---|---|
| $P_2O_5$ | 37.3 | 31.8 | 44.8 | 33.2 | 37.8 | 34.2 |
| PbO | 15.6 | 13.6 | 19.0 | 21.1 | 19.9 | 17.7 |
| $H_2O$ | 47.1 | 54.6 | 36.2 | 45.7 | 42.3 | 48.1 |
| Density | 3.0 | 2.9 | 3.1 | 3.5 | 3.6 | 3.4 |

|  | 13 | 14 | 15 | 16 | 17 | 18 |
|---|---|---|---|---|---|---|
| $P_2O_5$ | 50.2 | 35.6 | 36.1 | 35.2 | 33.6 | 30.5 |
| PbO | 15.0 | | | 16.3 | 14.2 | 18.0 |
| $H_2O$ | 34.8 | 50.1 | 49.5 | 43.6 | 51.6 | 49.8 |
| HgO | | 14.3 | | 4.9 | | |
| $Tl_2O$ | | | 14.5 | | 0.6 | 1.7 |
| Density | 2.9 | 2.9 | 2.7 | 3.4 | 3.0 | 3.5 |

|  | 19 | 20 | 21 | 22 | 23 | 24 | 25 |
|---|---|---|---|---|---|---|---|
| $P_2O_5$ | 36.3 | 36.5 | 34.0 | 33.2 | 33.4 | 29.8 | 30.2 |
| PbO | 16.1 | 14.8 | 14.6 | 14.1 | 14.2 | 14.0 | 17.8 |
| $H_2O$ | 47.0 | 47.6 | 47.8 | 49.9 | 50.7 | 52.1 | 47.4 |
| $ThO_2$ | | 1.1 | | | | | |
| $Al_2O_3$ | | | 3.6 | | | | 4.6 |
| $K_2O$ | | | | 2.8 | | | |
| BaO | | | | | 1.7 | | |
| HgO | | | | | | 4.1 | |
| $Bi_2O_3$ | 0.6 | | | | | | |
| Density | 3.2 | 3.1 | 3.0 | 3.0 | 3.0 | 3.3 | 3.0 |

The glasses of Table II are described in Table III on a weight percent basis.

*Table III*

|  | 1 | 2 | 3 | 4 | 5 | 6 |
|---|---|---|---|---|---|---|
| $P_2O_5$ | 54.0 | 56.0 | 54.4 | 53.9 | 56.2 | 55.7 |
| PbO | 36.0 | 36.0 | 36.0 | 36.0 | 37.4 | 37.2 |
| $H_2O$ | 10.0 | 8.0 | 9.6 | 10.1 | 6.4 | 7.1 |
| $H_2O+P_2O_5$ | 64.0 | 64.0 | 64.0 | 64.0 | 62.6 | 62.8 |

|  | 7 | 8 | 9 | 10 | 11 | 12 |
|---|---|---|---|---|---|---|
| $P_2O_5$ | 54.7 | 53.0 | 56.6 | 46.0 | 50.9 | 50.0 |
| PbO | 36.5 | 35.5 | 37.7 | 46.0 | 41.9 | 41.0 |
| $H_2O$ | 8.8 | 11.5 | 5.8 | 8.0 | 7.2 | 9.0 |
| $H_2O+P_2O_5$ | 63.5 | 64.5 | 62.3 | 54.0 | 58.1 | 59.0 |

|  | 13 | 14 | 15 | 16 | 17 | 18 |
|---|---|---|---|---|---|---|
| $P_2O_5$ | 63.8 | 55.8 | 42.0 | 47.3 | 52.1 | 43.5 |
| PbO | 30.6 |  |  | 35.0 | 34.8 | 40.2 |
| $H_2O$ | 5.6 | 9.9 | 7.3 | 7.6 | 10.2 | 9.0 |
| $H_2O+P_2O_5$ | 69.4 | 65.7 | 49.3 | 54.9 | 64.3 | 52.5 |
| HgO |  | 34.3 |  | 10.1 |  |  |
| $Tl_2O$ |  |  | 50.7 |  | 2.9 | 7.3 |

|  | 19 | 20 | 21 | 22 | 23 | 24 | 25 |
|---|---|---|---|---|---|---|---|
| $P_2O_5$ | 52.5 | 53.9 | 52.6 | 52.3 | 52.2 | 46.0 | 45.5 |
| PbO | 35.6 | 34.3 | 35.2 | 35.0 | 34.9 | 34.0 | 41.8 |
| $H_2O$ | 8.4 | 8.9 | 9.3 | 9.9 | 10.0 | 10.2 | 9.2 |
| $H_2O+P_2O_5$ | 60.6 | 62.8 | 61.9 | 62.2 | 62.2 | 56.2 | 54.5 |
| $ThO_2$ |  | 2.9 |  |  |  |  |  |
| $Al_2O_3$ |  |  | 2.9 |  |  |  | 3.7 |
| $K_2O$ |  |  |  | 2.9 |  |  |  |
| BaO |  |  |  |  | 2.9 |  |  |
| HgO |  |  |  |  |  | 9.8 |  |
| $Bi_2O_3$ | 2.8 |  |  |  |  |  |  |

While the particular batch ingredients can be selected from a wide variety of compounds of the glass constituents, providing that such compounds will decompose to the desired oxide at a temperature of less than about 300° C., it is desirable to utilize phosphoric acid, the oxides of phosphorus and hydrogen, as well as the oxides of the metallic constituents, as these materials produce a batch which melts most rapidly and, hence, there is less danger that the molten material will crystallize before it has cooled to the glassy state. However, it has been found desirable to utilize thallous nitrate rather than thallous oxide as the thallium-containing batch material because it dissolves more quickly than the oxide and also serves as a desirable oxidizing agent. Similarly a portion of the lead constituent may be added as lead nitrate, which serves as a desirable oxidizing agent.

While either form of mercurous oxide may be utilized in adding small amounts of mercury to the glass, red mercurous oxide is preferred to the yellow form when adding more than about 5 mole percent.

RADIATION SHIELDING WINDOW

As the glasses of this invention are corrosive when molten and also subject to attack by atmospheric moisture when cool, a suitable container is necessary to allow its use as a radiation shielding window.

A window according to this invention is shown in the drawing wherein 10 is the container having a cylindrical portion 11, a conical portion 12, end flanges 13 and 14, and an inert lining 15 on the interior portions thereof. Materials such as glass, enamel, or noble metals are suitable for the inert lining. Suitable transparent face plates 16 and 17, preferably composed of a non-darkening medium such as fused silica, are provided which can be utilized to enclose the radiation-shielding-window glass of this invention 18 by clamping against gaskets 19 and 20 composed of platinum-, gold- or tantalum-covered deformable materials such as rubber, metallic tubing, and the like, by a suitable means such as split ring clamps 21 and 22 and solid ring clamps 23 and 24, gaskets 25 and 26, wooden masks 27 and 28, and clamping means such as bolts 29 and nuts 30. A cylindrical expansion chamber, 31, is preferably incorporated in the housing to facilitate the fabrication of the window.

THE PREFERRED MODE

The preferred mode of practicing this invention comprises mixing the $P_2O_5$, $HNO_3$, and phosphoric acid, in the proportions set forth in Example 7 of Table I, in a platinum container and heating the batch materials to 250° C., to produce a uniform mixture. The lead oxide, in the form of dustless litharge, is added in small increments while the temperature of the batch is increased at a rate of about 10° C. per minute. The lead oxide is added by sprinkling it on the surface of the heated mixture at a uniform rate so that all of the lead oxide is incorporated in the batch by the time the molten batch is at a temperature of 350° C. The batch is then held at 350° C. until the foam which forms on the surface during the melting process disappears; which takes about 2 minutes. The glass-melting container is then removed from the heat-source and placed on a metal grid at room temperature or poured into the radiation-shielding-window housing and allowed to cool as rapidly as possible to below 200° C.

When the melt is to be poured into the radiation-shielding-window housing, the window is completely assembled with the exception of one face plate, such as 16, and the clamping and gasketing materials associated therewith. The melt is then poured into the housing and when the housing is filled, the remaining face plate is assembled. The melt is allowed to cool to 200° C. and then the completed housing is placed in an annealing furnace which allows the completed window to be cooled to room temperature at a rate of 10° C. to 25° C. per hour, preferably 20° C. per hour. As the radiation-absorbing glass is fluid as the window is assembled, no grinding thereof is required nor is any indexing fluid necessary as it is in contact with each face plate. In the preferred embodiment, wherein the window contains an expansion chamber, the window is placed in the annealing furnace with its axis horizontal and the expansion chamber above the main portion of the window.

The word "glass," as used herein, means an amorphous, super-cooled liquid in a non-equilibrium condition.

What is claimed is:

1. A transparent glass consisting essentially on a mole percent basis of about 26–51% $P_2O_5$, 33–56% $H_2O$, and a total 12–26% of an oxide of at least one metal of the Sixth Period of the periodic table selected from the group consisting of PbO, HgO, and $Tl_2O$, and 0–5% of optional glass-making metallic oxides selected from the group consisting of $Al_2O_3$, BaO, $ThO_2$, $Cs_2O$, $Bi_2O_3$, $K_2O$, SnO, and ZnO, the maximum total weight percent of the $P_2O_5$ and $H_2O$ being 70%.

2. A non-browning transparent glass having a density of at least 2.5 consisting essentially on a mole percent basis of about 26–51% $P_2O_5$, 33–56% $H_2O$, and a total of 12–26% of an oxide of at least one metal of the Sixth Period of the periodic table selected from the group consisting of PbO, HgO, and $Tl_2O$.

3. A transparent glass having a density of at least 2.5 consisting essentially on a mole percent basis of 26–51% $P_2O_5$, 33–56% $H_2O$, 0–26% PbO, 0–10% HgO, and 0–10% $Tl_2O$, the total of PbO, HgO, and $Tl_2O$, being 12–26%.

4. A non-browning transparent glass having a density of at least 2.5 consisting essentially on a mole percent basis of 31–39% $P_2O_5$, 36–55% $H_2O$, and 13–19% PbO.

5. A gamma radiation-shielding window comprising an hermetically sealed cell having two opposite transparent walls and enclosing a glass consisting essentially on a mole percent basis of 26–51% $P_2O_5$, 33–56% $H_2O$, and a total of 12–26% of an oxide of a metal of the Sixth Period of the periodic table selected from the group consisting of PbO, HgO, and $Tl_2O$, and 0–5% of other glass-making metallic oxides selected from the group consisting of $Al_2O_3$, $BaO$, $ThO_2$, $Cs_2O$, $Bi_2O_3$, $K_2O$, $SnO$, and $ZnO$, the maximum total weight percent of the $P_2O_5$ and $H_2O$ being 70%.

6. The method of making a transparent glass consisting essentially on a mole percent basis of 26–51% $P_2O_5$, 33–56% $H_2O$, and a total of 12–26% of an oxide of a metal of the Sixth Period of the periodic table selected from the group consisting of $PbO$, $HgO$, and $Tl_2O$, and 0–5% of other glass-making metallic oxides selected from the group consisting of $Al_2O_3$, $BaO$, $ThO_2$, $Cs_2O$, $Bi_2O_3$, $K_2O$, $SnO$, and $ZnO$, the total weight percent of the metal oxides being at least 30%, which comprises compounding a premix of an amount of phosphorus-containing compounds selected from the group consisting of $P_2O_5$ and phosphoric acid sufficient to produce the desired amount of $P_2O_5$ in the final glass, with a sufficient hydrogen-containing compound selected from the group consisting of $H_2O$ and phosphoric acid, to produce a glass containing on a mole percent basis 60–70% $H_2O$, and a minor proportion of the required metal compounds selected from the group consisting of oxide and nitrate, heating the thus formed premix to a temperature of between about 250° C. to 280° C., continuing to heat said mixture, to facilitate solution of the metal oxide and to remove excess $H_2O$, and simultaneously adding small increments of the remainder of said metal compounds, each additional portion of the metal compounds being added as soon as the previous portion has been dissolved in the mixture, the size of each portion of other metal compounds and the rate of heating of the mixture being selected so that the final addition of other metal compounds is complete by the time the mixture is heated to a temperature of 350° C., and thereafter cooling the fused glass batch to a temperature below 200° C.

References Cited in the file of this patent

UNITED STATES PATENTS

| | | |
|---|---|---|
| 1,964,629 | Grimm | June 26, 1934 |
| 2,381,925 | Pincus | Aug. 14, 1945 |
| 2,441,853 | Stanworth | May 18, 1948 |
| 2,518,194 | Silverman et al. | Aug. 8, 1950 |
| 2,577,627 | Pincus | Dec. 4, 1951 |
| 2,868,992 | Monk | Jan. 13, 1959 |
| 2,875,346 | Monk | Feb. 24, 1959 |

FOREIGN PATENTS

| | | |
|---|---|---|
| 764,575 | Great Britain | Dec. 28, 1956 |

OTHER REFERENCES

Harrison: J. Am. Cer. Soc., volume 30, No. 12 (1947), pages 365–366.